US011639742B2

(12) United States Patent
Groneberg et al.

(10) Patent No.: US 11,639,742 B2
(45) Date of Patent: May 2, 2023

(54) CLUTCH DEVICE AND DRIVETRAIN HAVING A CLUTCH DEVICE OF THIS KIND

(71) Applicant: BorgWarner Inc., Auburn Hills, MI (US)

(72) Inventors: Oliver Groneberg, St. Leon-Rot (DE); Friedrich Philipp Brezger, Karlsruhe (DE); Yun Kai Lim, Mannheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/731,618

(22) Filed: Apr. 28, 2022

(65) Prior Publication Data

US 2022/0356913 A1 Nov. 10, 2022

(30) Foreign Application Priority Data

May 7, 2021 (DE) .......................... 102021002421.4
Mar. 25, 2022 (DE) .......................... 102022001027.5

(51) Int. Cl.
  *F16D 21/06* (2006.01)
(52) U.S. Cl.
  CPC .................................... *F16D 21/06* (2013.01)
(58) Field of Classification Search
  CPC ................................ F16D 41/084; F16D 41/08
  See application file for complete search history.

(56) References Cited

U.S. PATENT DOCUMENTS

| 4,093,049 | A | * | 6/1978 | Watson | .................. | F16D 41/088 |
| | | | | | | 192/93 C |
| 10,451,122 | B2 | * | 10/2019 | Campton | ................. | F16D 41/14 |
| 2012/0090952 | A1 | * | 4/2012 | Lee | .......................... | F16D 41/14 |
| | | | | | | 192/41 R |

FOREIGN PATENT DOCUMENTS

| DE | 102012219034 A1 * | 5/2013 | ............. F16D 48/06 |
| DE | 102016221735 A1 * | 5/2018 | |

OTHER PUBLICATIONS

Machine translation of DE102012219034 retrieved from espacenet on Sep. 19, 2022 (Year: 2022).*

* cited by examiner

*Primary Examiner* — Stacey A Fluhart
(74) *Attorney, Agent, or Firm* — Howard & Howard Attorneys PLLC (57) ABSTRACT

The present invention relates to a clutch device (6) having a clutch (46) and an actuating mechanism (48) for actuating the clutch (46), wherein the actuating mechanism (48) has a first adjusting element (84) and a second adjusting element (86) which interacts with an impinging element (68) acting on the clutch (46). The first adjusting element (84) can be rotated in the axial direction (8, 10) relative to the second adjusting element (86) with displacement of the second adjusting element (86). Moreover, the present invention relates to a drivetrain (2) for a motor vehicle with a clutch device (6) of this kind.

20 Claims, 2 Drawing Sheets

CLUTCH DEVICE AND DRIVETRAIN HAVING A CLUTCH DEVICE OF THIS KIND

CROSS-REFERENCE TO RELATED APPLICATIONS

This application claims priority pursuant to 35 U.S.C. 119(a) to German Patent Application Nos. 102021002421.4 filed May 7, 2021 and 102022001027.5 filed Mar. 25, 2022, which applications are incorporated herein by reference in their entirety.

BACKGROUND

The present invention relates to a clutch device having a clutch and an actuating mechanism for actuating the clutch, wherein the actuating mechanism has a first adjusting element and a second adjusting element and the second adjusting element interacts with an impinging element acting on the clutch. Moreover, the present invention relates to a drivetrain for a motor vehicle having a clutch device of this kind.

Dual clutch devices are known from practice which in turn have a single clutch device connected upstream, in order to separate the input side of the dual clutch device from an internal combustion engine, for example, and then to drive the input side on the dual clutch device by means of an electric machine, so that this, too, can be classified as a drivetrain for a hybrid vehicle. The clutch device which is connected upstream of the dual clutch device has a clutch which is usually a multi-plate clutch. This clutch is, in turn, assigned an actuating mechanism which serves to actuate the clutch. Hydraulic actuating mechanisms, for example, qualify as the actuating mechanism in this case, in which an actuating piston is driven by the application of pressure of an associated pressure chamber and is therefore displaced in the axial direction, so that it interacts with the clutch by means of an impinging element. Moreover, electromagnetic actuating mechanisms are also known in the art, in which an adjusting element is displaced in a translatory manner in the axial direction by energizing the electromagnetic actuating mechanism, in order to interact with the clutch in this direction by means of an impinging element.

The clutch devices known in the art with the clutch and assigned actuating mechanism have proved effective, however they are capable of improvement to the extent that the design of the actuating mechanism and the adjustment of dedicated shift positions of the clutch can be simplified and the structural design freedom increased.

SUMMARY

A problem addressed by the present invention is therefore that of developing a clutch device of the generic kind in such a manner that it has a particularly simple design, allows simple adjusting of dedicated shift positions of the associated clutch and facilitates a particularly flexible arrangement and structural design. Moreover, the problem underlying the present invention is that of creating a drivetrain having an advantageous clutch device of this kind.

This problem is solved by the features specified in Patent Claims 1 or 12. Advantageous embodiments of the invention are the subject matter of the dependent claims.

The clutch device according to the invention comprises a clutch, preferably a ratchet clutch or a ratchet freewheel clutch, and an actuating mechanism for actuating the clutch. The clutch is preferably a clutch that can be shifted with the help of the actuating mechanism. The actuating mechanism has a first adjusting element and a second adjusting element interacting with the first adjusting element. The second adjusting element is designed in such a manner that it interacts with an impinging element acting on the clutch. The force transmission path for the actuating force in this case preferably runs via the first adjusting element, the second adjusting element and the impinging element. While an actuating piston has a hydraulic pressure applied to it in the clutch devices known in the art, in order to move the actuating piston in a translatory manner in the axial direction, so that the actuating piston interacts with the clutch or multi-plate clutch, the application of the actuating force to the clutch of the clutch device according to the invention initially takes place through rotation of the first adjusting element. Hence, the first adjusting element is rotated in the axial direction relative to the second adjusting element with displacement of the second adjusting element. In this way, a particularly space-saving design of the actuating mechanism, particularly with regard to the axial extent thereof, can be achieved, especially since a corresponding drive for applying the actuating force can be arranged in a radially offset manner in respect of the first and second adjusting elements. Consequently, a particularly flexible structural design of the clutch device and, consequently, of the drivetrain is possible with a clutch device of this kind. Moreover, it has been demonstrated that with the help of the clutch device according to the invention, particularly simple dedicated shift positions of the clutch can also be adjusted, something that will be dealt with in greater detail later.

In a preferred embodiment of the clutch device according to the invention, the first adjusting element and the second adjusting element are arranged on a fixed housing. The fixed housing may be the clutch housing in which the clutch is arranged, for example. The arrangement both of the first and the second adjusting elements on the fixed housing makes it possible for the actuating mechanism to be precisely positioned within the drivetrain, the design simplified and, moreover, a sometimes disadvantageous co-rotation of the first and the second adjusting elements during operation of the clutch device within the drivetrain prevented, which simplifies the control of the actuating mechanism or the impingement thereof.

In an advantageous embodiment of the clutch device according to the invention, the first adjusting element is rotatably mounted on the housing. With this embodiment, it has proved advantageous for the first adjusting element to be mounted on the housing rotatably by means of a slide bearing.

In order to allow a secure arrangement of the first adjusting element relative to the clutch and to the second adjusting element, and also within the drivetrain, the first adjusting element is fixed to the housing in the axial direction in a further advantageous embodiment of the clutch device.

In a further advantageous embodiment of the clutch device according to the invention, the second adjusting element is arranged on the housing in such a manner as to be non-rotatable and/or displaceable in the axial direction, so that a secure positioning of the second adjusting element relative to the first adjusting element, and also within the drivetrain on the housing, is guaranteed. It is preferable in this case for the second adjusting element to be arranged on the housing in a non-rotatable manner by means of an anti-rotational part fastened to the housing, especially since complex processing of the housing to ensure that it is non-rotatable can thereby be avoided. Instead of this, only the anti-rotational part, which could be separately produced to begin with, has to be fastened to the housing.

In a particularly preferred embodiment of the clutch device according to the invention, the first adjusting element has an adjusting ring which surrounds an adjusting tube of the second adjusting element. In this case, the adjusting ring and the adjusting tube are preferably arranged coaxially. The adjusting ring in this embodiment is also preferably likewise tubular in design. Moreover, it is preferred in this embodiment for projecting lugs to be arranged on the adjusting ring in the radial direction, the lugs extending in guides in the adjusting tube and being moved along the guides by rotating the adjusting ring while the adjusting tube is displaced. Consequently, in this case forced guidance which brings about a displacement of the adjusting tube in the axial direction through a rotation of the adjusting ring over the projecting lugs within the guides of the adjusting tube is correspondingly provided. The projecting lugs could be integrally configured with the adjusting ring. In a preferred design variant, the projecting lugs are, however, components fastened to the adjusting ring, wherein the components fastened to the adjusting ring are preferably cylindrical pins. Moreover, in order to bring about an at least partially gradual displacement during a rotation of the adjusting ring relative to the adjusting tube, the guides in the adjusting tube particularly preferably have a profile that deviates from a straight line, where appropriate a step-like profile.

In order to bring about the non-rotatable arrangement of the second adjusting element, as previously mentioned, in a further preferred embodiment of the clutch device according to the invention, at least one recess, preferably at least one edge indent, is provided in the adjusting tube of the second adjusting element, into which a projection of the housing or the anti-rotational part extends, thereby achieving the non-rotatable arrangement of the adjusting tube of the second adjusting element on the housing. As has already been indicated previously, it is advantageous in this case for the rotational resistance to be achieved by means of the anti-rotational part on the housing, in order to avoid the production of a projection on the housing itself, however the projection can also be designed in principle on or from the housing.

In a further advantageous embodiment of the clutch device according to the invention, the anti-rotational part has a tubular design, while the adjusting tube is supported on the tubular anti-rotational part in an axially displaceable manner in the radial direction. Consequently, the anti-rotational part in this embodiment is not only intended to guarantee the rotational resistance of the second adjusting element or the adjusting tube, but rather the tubular anti-rotational part in this case is also used for the sliding support of the adjusting tube, so that the anti-rotational part takes on an advantageous dual function. This is particularly advantageous to the extent that a quite complex processing of the housing itself can be dispensed with. Moreover, different materials which are adapted to the respective function can be used for the slide bearing in the axial direction and the housing. Hence, the housing can be produced from aluminium, for example, while the tubular anti-rotational part is produced from steel.

In accordance with a further advantageous embodiment of the clutch device according to the invention, the tubular anti-rotational part has at least one projection which extends into the at least one recess previously referred to in the adjusting tube. In this context, at least two, preferably at least three, projections on the tubular anti-rotational part, which extend into a corresponding number of recesses or indents in the adjusting tube, have proved advantageous.

In a particularly advantageous embodiment of the clutch device according to the invention, the first adjusting element has an adjusting lever projecting in the radial direction, wherein the adjusting lever preferably extends outwardly in the radial direction. The adjusting lever is in rotary drive connection with the adjusting ring, wherein the adjusting ring is preferably inwardly attached to the adjusting lever in the radial direction, which adjusting lever preferably has a rod-like design. By means of the adjusting lever of the first adjusting element, the actuating force for actuating the clutch can be introduced in a particularly simple manner via the actuating mechanism, particularly since a corresponding drive, or a drive mechanism, of the actuating mechanism can be positioned further from the rotational axis of the two adjusting elements and/or the rotational axis of the clutch, where the clutch device usually takes up less installation space.

In a further advantageous embodiment of the clutch device according to the invention, the adjusting lever is supported on and/or fastened to the adjusting ring and/or connected to the adjusting ring by means of a connecting ring configured integrally with the adjusting lever and/or integrally with the adjusting ring. The connecting ring preferably has a tubular design. The connecting ring is preferably configured in such a manner that it surrounds the adjusting ring. Moreover, it is preferable in the case of this embodiment for the first adjusting element to be supported on the housing by means of the connecting ring directly or indirectly in the radial direction, in order to facilitate a secure arrangement and rotatability of the first adjusting element on the housing. In this case, an indirect support in the radial direction is preferred, which can take place by means of a sliding ring fastened to the housing, for example.

In accordance with a further preferred embodiment of the clutch device according to the invention, the first adjusting element has an annular disc-shaped portion between the adjusting lever and the adjusting ring, where appropriate between the adjusting lever and the connecting ring, by means of which annular disc-shaped portion the first adjusting element is supported on the housing directly or indirectly in the axial direction, in order to bring about the fixing of the first adjusting element to the housing in the axial direction.

In the case of a further preferred embodiment of the clutch device according to the invention, the annular disc-shaped portion of the first adjusting element is arranged in the axial direction between the housing, on the one hand, and a retaining ring fastened to the housing, on the other hand. In this case, the retaining ring is fastened to the housing with the annular disc-shaped portion arranged in between, in order to allow an initially separate, simple production of the retaining ring and then allow the fixing of the first adjusting element by fastening the retaining ring to the housing. In this case, it is preferable for the holding ring to be fastened detachably, for example screwed, to the housing, so that a simple dismantling of the actuating mechanism is also allowed.

In a further advantageous embodiment of the clutch device according to the invention, the adjusting tube is coupled with the impinging element in a form-fitting manner in the axial direction. Alternatively or in addition, the adjusting tube is detachably coupled with the impinging element, in order to allow simple assembly and dismantling. The adjusting tube and impinging element can preferably be detached from one another through a relative movement in the radial direction.

In a further particularly preferred embodiment of the clutch device according to the invention, for the purposes of the form-fitting and/or detachable coupling between the adjusting tube and impinging element, a radial portion is provided on the impinging element or the adjusting tube, which extends into a circumferential groove on the adjusting tube or impinging element, in order to achieve a particularly simple, or simple to realize, form-fitting coupling. Moreover, in order to achieve simple detachability of the adjusting tube and impinging element, it is preferable in the case of this embodiment, for the circumferential groove or the radial portion to extend over no more than half the circumference of the adjusting tube or impinging element. Hence, for example, the circumferential groove on the adjusting tube may extend over at most half the circumference of the adjusting tube, while the radial portion projecting into the circumferential groove can extend on the impinging element over the entire circumference of the impinging element. In this way, the impinging element can easily be introduced into the circumferential groove in the radial direction or guided out of the circumferential groove in the radial direction during assembly and dismantling.

In accordance with a further particularly advantageous embodiment of the clutch device according to the invention, the impinging element is assigned a latching mechanism for latching the impinging element in at least one axial position, preferably in at least two or at least three axial positions, relative to the clutch, in order to allow a simple adjustment of dedicated shift positions of the clutch. It has proved advantageous in this case for the latching mechanism to have at least one spring-pretensioned latching element on the one side, which can be latched into a latching depression on the other side. Hence, the spring-pretensioned latching element can be arranged on a component of the clutch, for example, and can be latched into a latching depression in the impinging element, or vice versa, so that it is held as precisely as possible in the desired axial position of the impinging element relative to the clutch.

As already indicated beforehand, the clutch of the clutch device is preferably a shiftable clutch. In a further particularly preferred embodiment of the clutch device in accordance with the invention, the clutch is configured as a shiftable ratchet clutch, wherein a so-called ratchet freewheel clutch also qualifies as a ratchet clutch.

In an advantageous embodiment of the clutch device according to the invention, the ratchet clutch has a first raceway, a second raceway and at least one ratchet, by means of which the first and second raceway can be coupled to one another with rotary drive. The impinging element in this case is designed in such a manner that it interacts with the at least one ratchet, in order to allow corresponding pivoting of the ratchet.

In a further advantageous embodiment of the clutch device according to the invention, the impinging element is adjustable or displaceable between a first axial position, a second axial position and a third axial position. In the first axial position, the first raceway is coupled with rotary drive in a first and second relative rotational direction with the second raceway by means of the at least one ratchet. In the second axial position, the first raceway is coupled with rotary drive in the first relative rotational direction, but not in the second relative rotational direction, by means of the at least one ratchet. In the third axial position, the first raceway is coupled with the second raceway with rotary drive neither in the first, nor in the second, relative rotational position, by means of the at least one ratchet.

In accordance with a further particularly advantageous embodiment of the clutch device according to the invention, the impinging element is arranged in a co-rotating and axially displaceable manner on the second raceway of the ratchet clutch. In this case, the second raceway, which is the raceway on the output side, where appropriate, preferably has a tubular portion, on which the impinging element is arranged in a co-rotating and axially displaceable manner.

In a further advantageous embodiment of the clutch device according to the invention, the impinging element has at least one axially projecting impinging pin, by means of which the impinging element interacts with the at least one ratchet. It is preferred in this case for one ratchet to be assigned to each axially projecting impinging pin. The impinging pins and the assigned ratchets are designed in such a manner that an axial displacement of the impinging pin together with the impinging element leads to a pivoting movement or holding of the ratchet into/in a pivoting position, as is already known from the prior art.

In accordance with a further preferred embodiment of the clutch device according to the invention, the first adjusting element can be rotated about an axis relative to the second adjusting element, wherein the axis is arranged parallel to the rotational axis of the clutch or corresponds to the rotational axis of the clutch.

In accordance with a further advantageous embodiment of the clutch device according to the invention, the first adjusting element can have an actuating force applied to it with rotation relative to the second adjusting element, wherein the actuating force is preferably a tangential force. The application of force to the first adjusting element in this case preferably takes place by means of the adjusting lever of the first adjusting element already previously mentioned and, particularly preferably, by means of an adjusting rod interacting with the adjusting lever or an eccentric cam interacting with the adjusting lever, in order to apply the actuating force, where appropriate the tangential force, to the adjusting lever and therefore to the first adjusting element.

The drivetrain for a motor vehicle according to the invention has a dual clutch device, preferably a parallel dual clutch device, and a clutch device of the kind previously described according to the invention, wherein the clutch device is arranged in the torque transmission path and/or in the axial direction between a drive unit, possibly an internal combustion engine, and an input end of the dual clutch device. In relation to the advantages of the drivetrain according to the invention, reference is made to the advantages of the clutch device in accordance with the invention provided for therein, which advantages also apply in a corresponding manner to the drivetrain of the motor vehicle.

In a preferred embodiment of the drivetrain according to the invention, the dual clutch device and the clutch device are arranged in a shared space within a clutch housing, wherein the aforementioned clutch housing, where appropriate a clutch housing cover thereof, preferably forms the fixed housing on which the first adjusting element and the second adjusting element are arranged.

In a particularly preferred embodiment of the drivetrain according to the invention, the second raceway of the clutch of the clutch device designed as a ratchet clutch and/or the rotor of an electric machine are connected in a non-rotatable manner to the input end of the dual clutch device. This embodiment is therefore suitable to a particular degree for realizing a drivetrain within a hybrid vehicle.

In order to achieve a particularly compact structure of the drivetrain, the clutch device is arranged in an advantageous embodiment of the drivetrain according to the invention in a radially nested manner with at least one clutch of the dual clutch device.

BRIEF DESCRIPTION OF THE DRAWINGS

The invention is explained in greater detail below with the help of an exemplary embodiment, with reference to the attached drawings. In the drawings.

DETAILED DESCRIPTION

Figure 1:
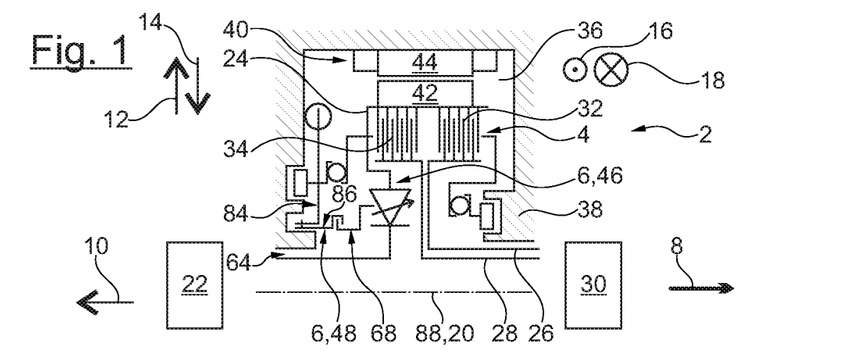
FIG. 1 shows a schematic representation of a drivetrain having a clutch device connected upstream of the dual clutch device.

FIG. 1 shows the schematic representation of an embodiment of a drivetrain 2 for a motor vehicle having a parallel dual clutch device 4 and an embodiment of a clutch device 6 upstream of the dual clutch device 4, so that here, too, a drivetrain 2 with a triple clutch device can be referred to. In FIG. 1, as also in the following figures, the axial directions 8, 10 opposing one another, the radial directions 12, 14 opposing one another, and the circumferential directions 16, 18 opposing one another are indicated with the help of corresponding arrows, wherein the drivetrain 2, or else components thereof, the dual clutch device 4 and the clutch device 6 can be rotated about a rotational axis 20 extending in the axial directions 8, 10.

The clutch device 6 is arranged in the torque transmission path and/or in the axial direction 8, 10 between a drive unit 22, where appropriate an internal combustion engine, the drivetrain 2 and an input side 24 of the dual clutch 4. Moreover, the dual clutch device 4 has a first and a second output side 26, 28 which lead to a transmission 30, so that the clutch device 6 and the dual clutch device 4 are arranged uniformly in the torque transmission path and/or in the axial direction 8, 10 between the drive unit 22, in the form of the internal combustion engine, and the transmission 30.

As can be seen from FIG. 1, the parallel dual clutch device 4 has a first and a second multi-plate clutch 32, 34, to which a joint input side 24 in the form of an outer plate carrier and the first or second output side 26 or 28 in the form of an inner plate carrier are assigned. The first and second multi-plate clutch 32, 34 are also graduated or arranged flush with one another in the axial direction 8, 10, as is customary in the case of parallel dual clutch devices.

The dual clutch device 4 and the clutch device 6 are arranged in a shared space 36, which is formed within a clutch housing 38 which forms a fixed housing. The clutch housing 38 in this case may be formed as part of a motor or gear housing, for example. The clutch device 6 is also arranged in a radially nested manner with one of the two clutches of the dual clutch device 4, in this case with the second multi-plate clutch 34 of the dual clutch device 4, in order to achieve a particularly compact design.

Moreover, in addition to the drive unit 22 in the form of the internal combustion engine, the drivetrain 2 is assigned an electric machine 40, whereof the rotor 42 is connected in a non-rotatable manner to the input side 24 of the dual clutch device 4, while the stator 44 of the electric machine 40 assigned to the rotor 42 is fastened to the fixed housing in the form of the clutch housing 38. Moreover, the second raceway of the clutch device 6 described in greater detail later is connected to the input side 24 of the dual clutch device 4 in a non-rotatable manner, so that the second raceway of the clutch device 6 can also be referred to as the raceway on the output side.

The clutch device 6 shown in FIG. 1 has a clutch 46 and an actuating mechanism 48 for actuating this clutch 46, wherein the further features, both of the clutch device 6, and also of the drivetrain 2, are to be explained in greater detail below with reference to FIGS. 1 to 3.

Figure 2:
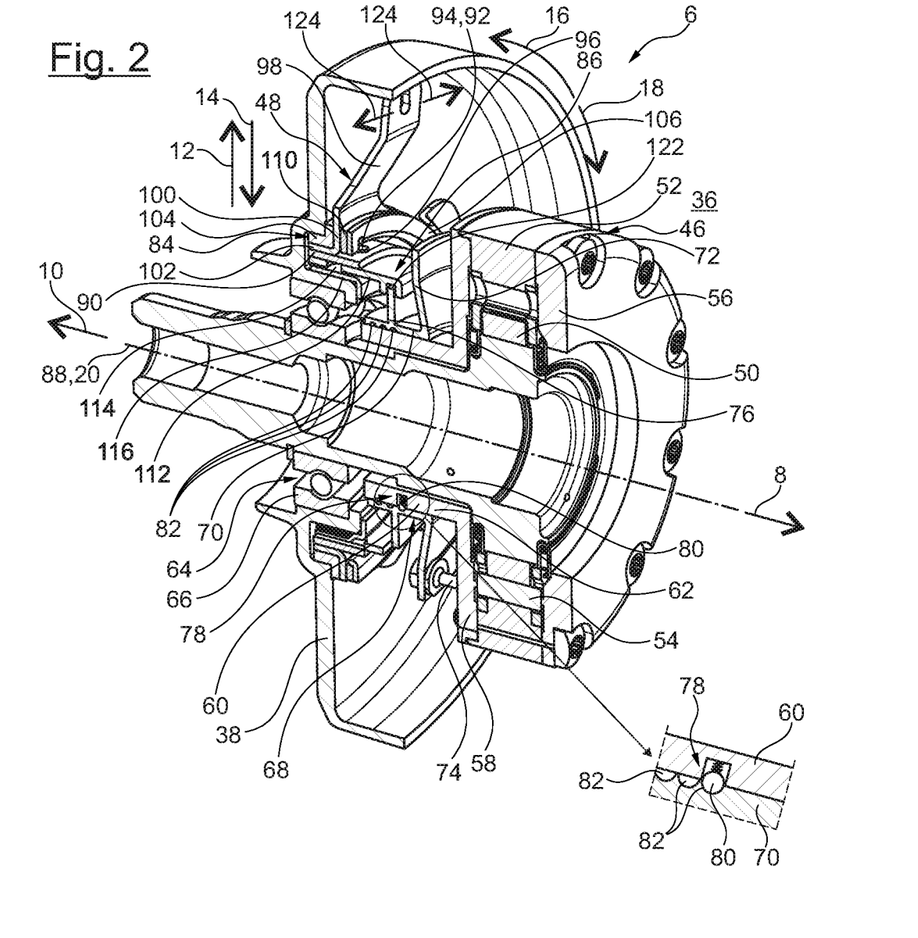
FIG. 2 shows a perspective representation of an embodiment of the clutch device for the drivetrain according to FIG. 1 as a cross-sectional representation and FIG. 3 shows an exploded view of the clutch device from FIG. 2 omitting the ratchet freewheel clutch.
Figure 3:
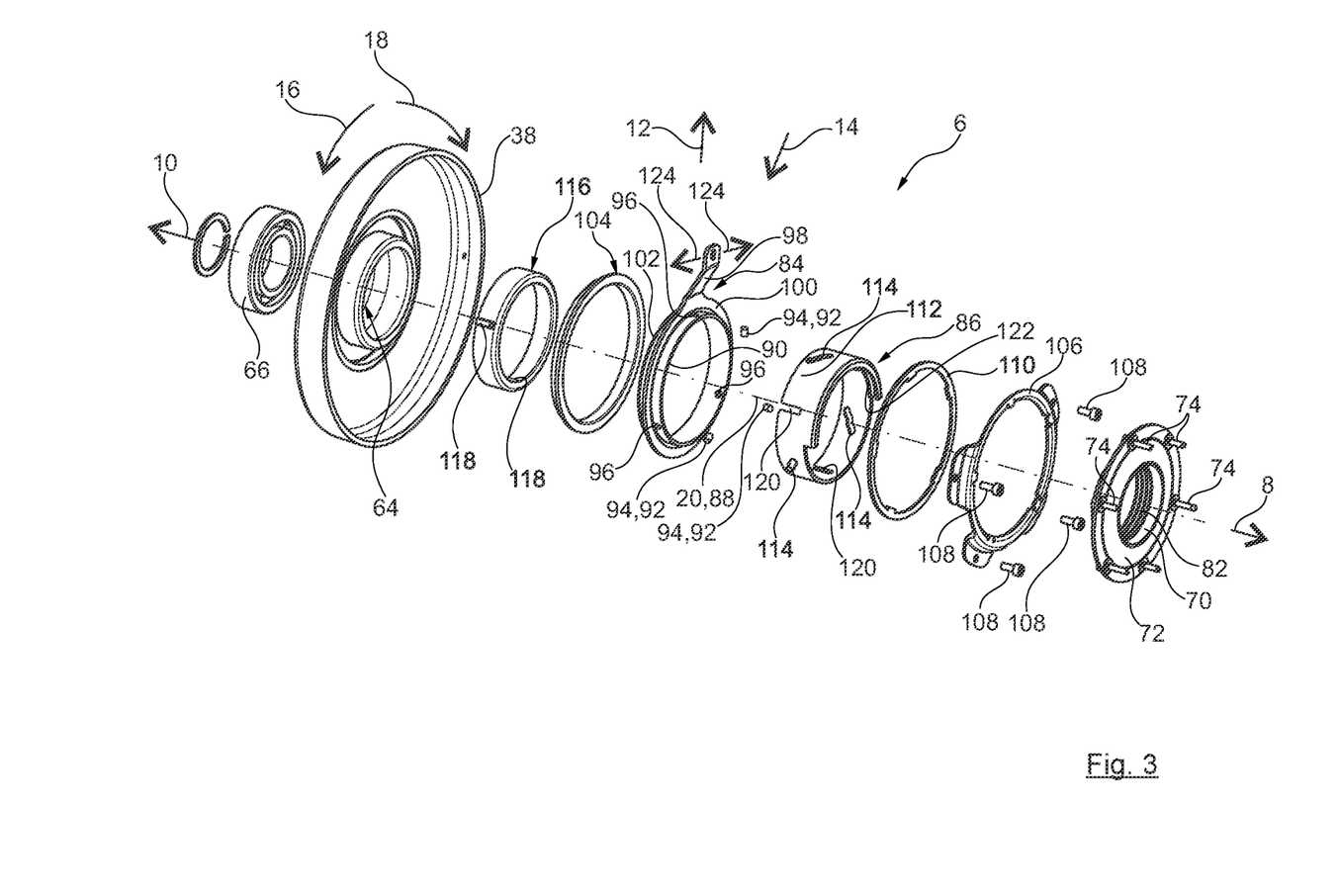

As can be seen from FIG. 2, the clutch 46 of the clutch device 6 is configured as a shiftable clutch 46, in this case as a shiftable ratchet clutch 46. A ratchet clutch 46 may also be referred to as a so-called ratchet freewheel clutch, wherein the ratchet clutch 46 which is depicted has a first raceway 50 configured as a first raceway 50, which is formed as an internal raceway on the input side in the radial direction 14, and a second raceway 52 formed as an external raceway on the output side in the radial direction 12, wherein the second raceway 52—as already indicated previously—is connected to the input side 24 of the dual clutch device 4 in a rotationally fixed manner. Consequently, the second raceway 52 surrounds the first raceway 50 in the radial direction 12 from the outside, wherein multiple ratchets 54 are arranged in the radial direction 12, 14 between the sides of the raceways 50, 52 facing one another, the ratchets being pivotable in a manner known per se between a coupling position and a release position, wherein the ratchets 54 are preferably pretensioned in the coupling position. Although not depicted in greater detail, two kinds of ratchet are provided in the embodiment shown which can be pivoted in an opposing direction into the coupling position and in an opposing direction into the release position.

The circumferential gap between the first raceway and the second raceway 50, 52, in which the ratchets 54 are arranged, is delimited in the axial direction 8 by a first side wall 56 and in the axial direction 10 by a second side wall 58, which each have a substantially annular disc-shaped design and are fastened to the second raceway 52 in a non-rotatable manner. Inwardly in the radial direction 14, a tubular portion 60 is attached to the second side wall 58, which extends in an axial direction 10 starting from the second side wall 58. The tubular portion 60 is connected to the second side wall 58 in a non-rotatable manner, in this case through having an integral design, for example, while the second side wall 58—as already previously indicated— is fastened to the second raceway 52 in a non-rotatable manner, so that in the case of the tubular portion 60, this can also be referred to as a tubular portion 60 of the second raceway 52. The first raceway 50, on the other hand, is fastened to an input shaft or input hub 62 in a non-rotatable manner, which extends in the axial direction 10 though the tubular portion 60 and through a central opening 64 in the fixed housing in the form of the clutch housing 38, so that it is directly or indirectly connected to an output side of the drive unit 22. Moreover, the input shaft or input hub 62 is supported in the opening 64 on the clutch housing 38 by means of a radial bearing 66, preferably a rolling bearing.

The actuating mechanism 48 described in greater detail below interacts with an impinging element 68 acting on the ratchet clutch 46. The impinging element 68 is co-rotational and arranged so as to be displaceable in an axial direction 8, 10—at least directly. To be more precise, the impinging element 68 is arranged on the tubular portion 60 of the second raceway 52. To this end, the impinging element 68 has a tubular portion 70 which can be supported on the outside of the tubular portion 60 in a radial direction 12, 14 and which is therefore arranged so as to be slidingly displaceable in the axial direction 8, 10 on the tubular portion 60 of the second raceway 52. A first radial portion 72 is attached to the end of the tubular portion 70 pointing in the axial direction 8, the first radial portion 72 extending outwardly in a radial direction 12 starting from the tubular portion 70 and having a substantially annular disc-shaped design.

Multiple impinging pins 74 projecting in the axial direction 8 and spaced apart from one another in the circumferential direction 16, 18 are fastened to the first radial portion 72, by means of which impinging pins the impinging element 68 interacts with the ratchets 54 of the ratchet clutch 46, wherein an impinging pin 74 interacts in each case with one of the ratchets 54 which are present in a number corresponding to the number of impinging pins 74. It can also be seen from FIG. 2 that the impinging pins 74 extend through recesses which are not depicted in greater detail in the second side wall 58, so that they can interact with the ratchets 54 arranged behind the second side wall 58.

Moreover, a second radial portion 76 is arranged on the tubular portion 70 in the axial direction 10 spaced apart from the first radial portion 72, the second radial portion extending outwardly starting from the tubular portion 70 in a radial direction 12 and being configured circumferentially in the circumferential direction 16, 18. Consequently, the second radial portion 76 also has a substantially annular disc-shaped design, wherein the second radial portion 76 of the form-fitting coupling described in greater detail later is used with the actuating mechanism 48.

It is evident from the preceding description that the first and second raceway 50, 52 can be coupled to one another with rotary drive by means of the ratchets 54, wherein the impinging element 68 interacts with the ratchets 54 via the aforementioned impinging pins 74, in order to move the ratchet clutch 46 into different shifting positions. In the embodiment shown, the impinging element 68 can be adjusted between a first axial position, which is shown in FIG. 2 and in which the first raceway 50 is coupled with rotary drive in a first and second relative rotational direction with the second raceway 52, a second axial position, in which the first raceway 50 is coupled with rotary drive with the second raceway 52 in the first relative rotational direction, but not in the second relative rotational direction, and a third axial position relative to the tubular portion 60 of the second raceway 52, in which the first raceway 50 is coupled with rotary drive with the second raceway 52 neither in the first, nor in the second, relative rotational position. In the case of a coupling in the first and second axial position, this coupling takes place via the ratchets 54 in the respective coupling position.

So that the respective shift position of the ratchet clutch 46 can be adjusted particularly securely and simply, the impinging element 68 is assigned a latching mechanism 78 for latching the impinging element 68 in at least two, in this case in three, axial positions, relative to the ratchet clutch 46. The aforementioned latching mechanism 78 is configured or arranged between the tubular portion 60 of the second raceway 52 and the tubular portion 70 of the impinging element 68. The latching mechanism 78 therefore has a spring pretensioned latching element 80, on the one hand, and multiple latching depressions 82, on the other, wherein in the concrete embodiment, latching depressions 82 which rotate in a groove shape in the circumferential direction 16, 18 and are arranged one behind the other in the axial direction 8, 10, are provided in the inside of the tubular portion 70, while the at least one latching element 80 is arranged in an outwardly pretensioned manner in the radial direction 12 on the tubular portion 60 of the second raceway 52. Thanks to the three latching depressions 82, the impinging element 68 can therefore be detachably latched in all three aforementioned axial positions.

The actuating mechanism 48 is substantially composed of a first adjusting element 84, a second adjusting element 86 and the impinging element 68, with which the second adjusting element 86 interacts. In this case, the first adjusting element 84 is rotatable about an axis 88 with displacement of the second adjusting element 86 in the axial direction 8, 10 relative to the second adjusting element 86, so that the impinging element 68 is displaced in the previously described manner between the three axial positions relative to the ratchet clutch 46. The axis 88, about which the first adjusting element 84 can be rotated in the circumferential directions 16, 18, is oriented parallel to the rotational axis 20, even corresponds to the rotational axis 20 of the ratchet clutch 46 in the embodiment shown.

The first adjusting element 84 and the second adjusting element 86 are arranged on the fixed housing 38 in the form of the clutch housing 38. The first adjusting element 84 therefore has a circumferential adjusting ring 90 in the circumferential direction 16, 18, wherein the actuating ring 90 preferably has a tubular design. Inwardly projecting lugs 92 are arranged on the tubular adjusting ring 90 in the radial direction 14. In the embodiment shown, the lugs 92 were fastened to the adjusting ring 90 subsequently, wherein the projecting lugs 92 are preferably the cylindrical pins 94 indicated in FIG. 3, which were fastened in corresponding recesses in the adjusting ring 90.

Moreover, the first adjusting element 84 has an elongate adjusting lever 98 projecting outwardly in the radial direction 12, wherein the adjusting lever 98 is connected with rotary drive to the adjusting ring 90 of the first adjusting element 84 lying further inwardly in the radial direction 14. Inwardly in the radial direction 14, an annular disc-shaped portion 100 of the first adjusting element 84 which rotates in the circumferential direction 16, 18 is attached to the adjusting lever 98. Inwardly in the radial direction 14, a tubular connecting ring 102 is attached to the annular disc-shaped portion 100, which ring extends in the axial direction 10 starting from the annular disc-shaped portion 100. The adjusting lever 98, the annular disc-shaped portion 100 and the connecting ring 102 are formed integrally with one another, wherein the connecting ring 102 is supported by the connecting ring 102 in the radial direction 12, 14 and is fastened or connected to the adjusting ring 90. The connecting ring 102 also surrounds the adjusting ring 90 in the radial direction 12 from outside. The connecting ring 102 and the adjusting ring 90 can therefore be soldered to one another, for example. In principle or alternatively, however, the connecting ring 102 and the adjusting ring 90 can also be integrally formed with one another, in that the first adjusting element 84 is designed as an integral sheet moulded part, for example. Irrespective of whether there is an integral or multi-part design, it is preferable for the first adjusting element 84 to be formed from one or multiple sheet moulded parts, so that a particularly space-saving, lightweight and simple structure can be achieved.

The tubular connecting ring 102 is used, moreover, to indirectly or directly support the first adjusting element 84 in the radial direction 12, 14. In the embodiment shown, the side of the tubular connecting ring 102 pointing outwardly in the radial direction 12 is indirectly supported via a sleeve bearing 104 fastened to the clutch housing 38 in the radial direction 12, 14. Moreover, the first adjusting element 84 is also directly or indirectly supported in the axial directions 8, 10 on the fixed clutch housing 38. The aforementioned support in the axial direction 8, 10 is preferably provided by means of the annular disc-shaped portion 100 of the first adjusting elements 84 referred to previously. The annular disc-shaped portion 100 is therefore arranged in the axial direction 8, 10 between the clutch housing 38, on the one hand, and a retaining ring 106 fastened to the clutch housing 38, on the other. The retaining ring 106 is therefore fastened to the clutch housing 38 with the annular disc-shaped portion 100 arranged in between, wherein the fastening takes place by means of the screws 108 shown in FIG. 3, so that in this case—generally speaking—the retaining ring 106 is fastened detachably.

The annular disc-shaped portion 100 of the first adjusting element 84 is not directly supported on the retaining ring 106 in the axial direction 8, however, but instead a thrust washer 110 rotating in the circumferential direction 16, 18 is arranged between the annular disc-shaped portion 100 and the retaining ring 106 in the axial direction 8, 10. In a corresponding manner, the annular disc-shaped portion 100 is also not directly supported on the clutch housing 38 in the opposite axial direction 10, but instead the support takes place in the axial direction 10 directly via a sleeve bearing 38 fastened to the clutch housing 38, wherein the sleeve bearing is similarly used for axial support by the already previously mentioned sleeve bearing 104 for radial support of the first adjusting element 84 on the clutch housing 38, in order to reduce the variety of parts. Consequently, the first adjusting element 84 is not only mounted rotatably on the clutch housing 38, but instead also fixed in the axial direction 8, 10 to the clutch housing 38.

The second adjusting element 86 is arranged in a non-rotatable manner and so as to be displaceable in the axial direction 8, 10. In this case, the second adjusting element 86 has an adjusting tube 112 extending in the axial directions 8, 10, which is surrounded from the outside by the adjusting ring 90 of the first adjusting element 84 in the radial direction 12. The adjusting ring 90 in this case surrounds the adjusting tube 112 of the second adjusting element 86 in such a manner that the lugs 92 of the first adjusting element 84 which project inwardly in the radial direction 14 extend in guides 114 in the adjusting tube 112. The guides 114, which can also be referred to as elongate recesses, are set at an oblique angle in relation to the rotational axis 20 and, moreover, have a profile which deviates from a straight line, preferably a step-like profile. By rotating the adjusting ring 90, the lugs 92 projecting into the guides 114 are therefore moved along the guides 114 in the axial directions 8, 10 with displacement of the adjusting tube 112, wherein in this case forced guidance can also be referred to. Consequently, a rotational movement of the first adjusting element 84 is converted into a translatory movement of the second adjusting element 86 in the axial directions 8, 10 in this case too.

So that both the non-rotatable and the displaceable arrangement of the adjusting tube 112 of the second adjusting element 86 on the housing can be realized in the form of the clutch housing 38, in the embodiment shown, an anti-rotational part 116 fastened to the clutch housing 38 is provided. As can be seen from FIG. 3, in particular, the anti-rotational part 116 is substantially tubular in design and fixed to the clutch housing 38 with the inwardly facing side, wherein the adjusting tube 112 surrounds the anti-rotational part 116 in the radial direction 12 from the outside and is supported so as to be axially displaceable on the tubular anti-rotational part 116.

Moreover, on the anti-rotational part 116 at least one projection 118, in this case a projection 118 projecting outwardly in the radial direction 12, is provided on the tubular anti-rotational part 116, which anti-rotational part extends in the aforementioned radial direction 12 into a recess 120 in the adjusting tube 112, so that in this way the non-rotatable arrangement of the adjusting tube 112 on the anti-rotational part 116 is guaranteed, which anti-rotational part is for its part fastened to the clutch housing 38 in a non-rotatable manner. The recesses 120 in the embodiment shown are edge indents in the adjusting tube 112, as can be deduced from FIG. 3, in particular, so that the adjusting tube 112 can be attached to the anti-rotational part 116, and therefore to the clutch housing 38, particularly simply during assembly. In the embodiment shown, the projections 118 are, moreover, configured in an elongate manner in the axial direction 8, 10, so as to guarantee particularly precise guidance in the axial direction 8, 10 and stable rotational resistance, irrespective of the position of the adjusting tube 112 relative to the anti-rotational part 116.

Even though it is not represented, the guidance of the adjusting tube 112, and the rotational resistance thereof, could also take place directly between the adjusting tube 112 and the clutch housing 38, in that, for example, a corresponding guide surface on the clutch housing 38 and/or a corresponding projection on the clutch housing 38 is provided, which then extends into the recess 120 in the adjusting tube 112. From a production point of view, and also in consideration of functional capacity, the indirect rotational resistance and guidance on the anti-rotational part 116, which is initially separate and then fastened to the clutch housing 38, is preferred.

In order to achieve the previously referred to interaction between the second adjusting element 86 and the impinging element 68 acting on the ratchet clutch 46, the adjusting tube 112 of the second adjusting element 86 is coupled with the impinging element 68 in a form-fitting manner in the axial direction 8, 10, so that an axial movement of the adjusting tube 112 in the same way causes an axial movement of the impinging element 68. In this case, within the meaning of a simplified assembly and dismantling, a detachable, form-fitting coupling is moreover provided between the adjusting tube 112 and the impinging element 68. To this end, a circumferential groove 122 is provided on the end of the adjusting tube 112 of the second adjusting element 86 facing in the axial direction 8, the opening of which faces inwardly in the radial direction 14. However, the circumferential groove 122 extends at most over half the circumference of the adjusting tube 112, as can be inferred from FIG. 3, in particular, in order to achieve simple detachability between the adjusting tube 112 and the impinging element 68. On the other hand, the second radial portion 76 of the impinging element 68 which completely rotates in the circumferential direction 16, 18 extends outwardly in the radial direction 12 into the circumferential groove 122, so that a form-fitting coupling is achieved in the axial direction 8, 10 between the adjusting tube 112 and the impinging element 68.

Even though it is not shown, a radial portion could also be provided on the adjusting tube 112, which extends into a circumferential groove on the impinging element 68. Rather than the circumferential groove 122, the second radial portion 76 could also be limited in principle in its extent in the circumferential direction 16, 18, in order to achieve simple assembly and dismantling, even if the configuration shown is the preferred one.

In the embodiment shown, the first adjusting element 84 can have an actuation force 124, preferably a tangential force, applied to it with rotation relative to the second adjusting element 86. In this case, the first adjusting element 84 preferably has the actuating force 124 or tangential force applied to it via an end portion of the actuating lever 98 of the first adjusting element 84 externally located in the radial direction 12, wherein this can be brought about by an adjusting bar interacting with the adjusting lever 98 and preferably extending tangentially or by a drivable eccentric cam that can interact with the adjusting lever 98. In this way, an actuating force 124 or tangential force acting on the first adjusting element 84 can be initially converted into a rotation of the first adjusting element 84 about the axis 88, which is converted by means of the projecting lugs 92 and the guides 114 finally into a translatory movement of the second adjusting element 86 in the axial directions 8, 10, so that the impinging element 68 coupled therewith can be moved into the desired axial position, in which the ratchet clutch 46 adopts a corresponding shifting position.

LIST OF REFERENCE SIGNS 2 drivetrain
4 dual clutch device
6 clutch device
8 axial direction
10 axial direction
12 radial direction
14 radial direction
16 circumferential direction
18 circumferential direction
20 rotational axis
22 drive unit
24 input side
26 first output side
28 second output side
30 transmission
32 first multi-plate clutch
34 second multi-plate clutch
36 space
38 clutch housing
40 electrical machine
42 rotor
44 stator
46 clutch/ratchet clutch
48 actuating mechanism
50 first raceway
52 second raceway
54 ratchet
56 first side wall
58 second side wall
60 tubular portion
62 input shaft/input hub
64 opening
66 radial portion
68 impinging element
70 tubular portion
72 first radial portion
74 impinging pin
76 second radial portion
78 latching mechanism
80 latching element
82 latching depression
84 first adjusting element
86 second adjusting element
88 axis
90 adjusting ring
92 lugs
94 cylindrical pins
96 recesses
98 adjusting lever
100 annular disc-shaped portion
102 connecting ring
104 slide bearing
106 retaining ring
108 screw
110 thrust washer
112 adjusting tube
114 guides
116 anti-rotational part
118 projection
120 recess
122 circumferential groove
124 actuating force

What is claimed is:

1. A clutch device having a clutch rotatable about a rotational axis extending in an axial direction and an actuating mechanism for actuating the clutch, wherein the actuating mechanism has a first adjusting element and a second adjusting element, wherein the second adjusting element interacts with an impinging element acting on the clutch, and wherein the first adjusting element is configured to be rotated in the axial direction relative to the second adjusting element with displacement of the second adjusting element;
   wherein the first adjusting element and the second adjusting element are arranged on a fixed housing;
   wherein the first adjusting element is rotatably mounted on the housing and/or is fixed to the housing in the axial direction, and/or the second adjusting element is non-rotatable and/or is arranged so as to be displaceable on the housing in the axial direction; and
   wherein the first adjusting element has an adjusting ring which surrounds an adjusting tube of the second adjusting element, wherein lugs are arranged on the adjusting ring with the lugs extending in guides in the adjusting tube and moveable along the guides by rotating the adjusting ring while the adjusting tube is displaced.

2. A clutch device according to claim 1, characterized in that at least one recess is provided in the adjusting tube, into which a projection of the housing or an anti-rotational part extends, thereby achieving the non-rotatable arrangement of the adjusting tube of the second adjusting element on the housing.

3. A clutch device according to claim 2, wherein the anti-rotational part is tubular, the adjusting tube is supported on the tubular anti-rotational part in an axially displaceable manner in the radial direction, and the tubular anti-rotational part has at least one projection which extends into the at least one recess.

4. A clutch device according to claim 2, characterized in that the first adjusting element has an adjusting lever projecting in the radial direction which is in rotary drive connection with the adjusting ring.

5. A clutch device according to claim 1, characterized in that the first adjusting element has an adjusting lever projecting in the radial direction which is in rotary drive connection with the adjusting ring.

6. A clutch device according to claim 5, characterized in that the first adjusting element has an annular disc-shaped portion between the adjusting lever and the adjusting ring for supporting the annular disc-shaped portion of the first adjusting element on the housing in the axial direction, wherein the annular disc-shaped portion is arranged in the axial direction between the housing on the one hand, and a retaining ring fastened to the housing on the other hand, and wherein the retaining ring is fastened to the housing with the annular disc-shaped portion in between.

7. A clutch device according to claim 5, wherein the adjusting lever is supported on and/or connected to the adjusting ring by a tubular connecting ring configured integrally with the adjusting lever and/or integrally with the adjusting ring, which surrounds the adjusting ring.

8. A clutch device according to claim 5, wherein the adjusting lever is supported on and/or connected to the adjusting ring by the first adjusting element which is supported on the housing in the radial direction.

9. A clutch device according to claim 1, characterized in that the adjusting tube is coupled with the impinging element in the axial direction, wherein for this coupling, a radial portion on the impinging element or adjusting tube extends into a circumferential groove on the adjusting tube or impinging element.

10. A clutch device according to claim 9, wherein the circumferential groove or the radial portion extends over at most half of the circumference of the adjusting tube or impinging element.

11. A clutch device according to claim 1, characterized in that the impinging element is assigned a latching mechanism for latching the impinging element in at least one axial position relative to the clutch.

12. A clutch device according to claim 11, wherein the latching mechanism has at least one spring-pretensioned latching element on the one side, which can be latched into a latching depression on the other side.

13. A clutch device according to claim 1, characterized in that the first adjusting element is rotatable around an axis extending parallel to the rotational axis of the clutch or corresponding to the rotational axis of the clutch, and is rotatable relative to the second adjusting element.

14. A clutch device according to claim 1, characterized in that the first adjusting element is configured to have an actuation force applied to it with rotation relative to the second adjusting element by an adjusting lever of the first adjusting element.

15. A drivetrain with a dual clutch device and a clutch device according to claim 1 in the torque transmission path and/or in the axial direction between a drive unit and an input end of the dual clutch device, wherein the dual clutch device and the clutch device are arranged in a shared space within a clutch housing, which forms the fixed housing.

16. A drivetrain according to claim 15, wherein a second raceway of the clutch and/or a rotor of an electric machine are connected in a non-rotatable manner to the input end of the dual clutch device.

17. A clutch device having a clutch rotatable about a rotational axis extending in an axial direction and an actuating mechanism for actuating the clutch, wherein the actuating mechanism has a first adjusting element and a second adjusting element, and wherein the second adjusting element interacts with an impinging element acting on the clutch, wherein the first adjusting element is configured to be rotated in the axial direction relative to the second adjusting element with displacement of the second adjusting element;
wherein the clutch is a shiftable ratchet clutch, wherein the ratchet clutch has a first raceway, a second raceway and at least one ratchet for coupling the first and second raceway to one another with rotary drive, and the impinging element interacts with the at least one ratchet, wherein the impinging element is adjustable between a first axial position, in which the first raceway is coupled with rotary drive in a first and second relative rotational direction, a second axial position, in which the first raceway is coupled with rotary drive in the first relative rotational position, but not in the second relative rotational direction, and a third axial position, in which the first raceway is coupled with the second raceway with rotary drive neither in the first, nor in the second, relative rotational position, by the at least one ratchet.

18. A clutch device according to claim 17, characterized in that the impinging element is arranged in a co-rotating and axially displaceable manner on the second raceway, and has at least one axially projecting impinging pin for the impinging element to interact with the at least one ratchet.

19. A clutch device having a clutch rotatable about a rotational axis extending in an axial direction and an actuating mechanism for actuating the clutch, wherein the actuating mechanism has a first adjusting element and a second adjusting element, wherein the second adjusting element interacts with an impinging element acting on the clutch, and wherein the first adjusting element is configured to be rotated in the axial direction relative to the second adjusting element with displacement of the second adjusting element;
wherein the impinging element is assigned a latching mechanism for latching the impinging element in at least one axial position relative to the clutch; and
wherein the latching mechanism has at least one spring-pretensioned latching element on the one side, which can be latched into a latching depression on the other side.

20. A drivetrain having:
a dual clutch device; and
a clutch device having a clutch rotatable about a rotational axis extending in an axial direction and an actuating mechanism for actuating the clutch, wherein the actuating mechanism has a first adjusting element and a second adjusting element, wherein the second adjusting element interacts with an impinging element acting on the clutch, and wherein the first adjusting element is configured to be rotated in the axial direction relative to the second adjusting element with displacement of the second adjusting element;
wherein the clutch device is in a torque transmission path and/or in the axial direction between a drive unit and an input end of the dual clutch device, wherein the dual clutch device and the clutch device are arranged in a shared space within a clutch housing, which forms the fixed housing; and wherein the clutch device is arranged in a radially nested manner with at least one clutch of the dual clutch device.

* * * * *